United States Patent [19]

McMahon et al.

[11] 4,090,088
[45] May 16, 1978

[54] POWER MANAGEMENT SYSTEM

[75] Inventors: Melvin B. McMahon, San Jose, Calif.; Lloyd A. Guth, Palatine; Larry A. Thomas, Elmhurst, both of Ill.

[73] Assignee: Encon Systems, Inc., Santa Clara, Calif.

[21] Appl. No.: 769,584

[22] Filed: Feb. 17, 1977

[51] Int. Cl.² ............................................. H02J 13/00
[52] U.S. Cl. ................................................... 307/38
[58] Field of Search .................. 307/34, 35, 38, 39, 307/41, 62, 125, 126; 235/151.21

[56] References Cited

U.S. PATENT DOCUMENTS

3,906,242  9/1975  Stevenson ............................ 307/38
4,031,406  6/1977  Leyde et al. ......................... 307/41

Primary Examiner—Herman J. Hohauser
Attorney, Agent, or Firm—Boone, Schatzel, Hamrick & Knudsen

[57] ABSTRACT

A power management system for controlling the power usage by a plurality of loads in a facility and including a system control unit for monitoring the power consumption of the loads and for generating a control signal when the consumption falls below a low level and when the consumption exceeds a high level, and a load control unit and a plurality of switching modules for receiving the control signal, and based upon eligibility and a preassigned priority ranking, selecting and shutting down one or more of the loads for a first predetermined time period followed by a second predetermined time period during which the load is allowed to run, any shutdown load being designated as ineligible for further shutdowns during the cycle including both of the first and second time periods.

20 Claims, 4 Drawing Figures

Fig_1

Fig._2

Fig_3

Fig_4

POWER MANAGEMENT SYSTEM

BACKGROUND OF THE INVENTION

1. Field of the Invention

The present invention relates generally to power distribution systems and more particularly to an improved power management system for reducing peak power consumption and improving consumption efficiency.

2. Description of the Prior Art

Power management is the supervising and controlling of a number of power consuming devices in such a manner as to produce energy cost savings. Control of various electric devices, commonly called "loads", is done to achieve savings in two basic ways — demand limiting and consumption limiting. To further understand what demand and consumption limiting are, the terms "demand" and "consumption" must be defined.

Demand is a term which relates to one aspect of the measurement of power for most commercial users of electricity. As more and more electrical devices in a building are turned on, a greater and greater load on the power company equipment occurs. This load is measured in kilowatts and is referred to as demand. The power meter in the building monitors this demand and records the highest occurrence of demand for the month. The power company bill will reflect this demand "peak" and charge for it — even if a portion of the demand value was due only to some extra heavy usage which lasted for just a few minutes on only one day of the billing period.

Consumption is a more widely understood aspect of power measurement and relates to the units of energy used, regardless of how fast or slowly they are used. These units of energy are "kilowatt-hours". The power compamny bill will reflect charges for the total number of kilowatt-hours used during the billing period.

The control of demand and consumption requires two different approaches. First, demand control necessitates the monitoring of the total incoming power to the facility. When the demand value is known at all times, loads can be turned off whenever an increase or "peak" begins to occur. In this way, a power management system will "orchestrate" the operation of a portion of the loads in a building such that power usage becomes smooth and continuous — demand peaks are prevented. This type of control will result in a lower demand reading on the power meter, and thus, a lower charge for demand on the monthly bill.

Consumption control is much different from demand control because it deals directly with operation efficiency not simply operating orchestration. Consumption savings cannot be achieved unless something can be turned off which is running wastefully or needlessly. The key to all consumption savings if the avoidance of energy waste. Some devices, such as refrigeration equipment, have significant inherent operating waste — inefficiency. It has not been until recent years that manufacturers have been pressed to design and produce electric motors and other equipment which would do more work for each kilowatt-hour used. This does not mean, however, that otherwise inefficient devices cannot be goverened in such a manner that they will operate more efficiently. This is the job of a power management system.

Another area in which power management is useful is in startup, following a shutdown or a power failure. If all energy consuming devices are allowed to start simultaneously, each requiring a large starting current, the combination can result in a large power surge which can exceed the wiring capacity of many older buildings. As a result, in the past it has been necessary to manually turn off all of the circuit breakers and then turn them on sequentially to avoid the surge. A well-designed power management system can accomplish this automatically.

Finally, power management can extend equipment life by eliminating short cycling. Short cycling is a condition where a compressor or other load cycles on and of rapidly. This of course causes increased contact erosions and wear as well as fatiguing of the mechanical components of the system. By controlled cycling of the power to such equipment for relatively long periods of time, short cycling can be eliminated and equipment life can be extended.

Many prior art devices periodically switch groups of loads off for a preset time. The period of the sequence is often keyed to the period used by the utility companies in computing peak demand. Typically such periods are 32 minutes long. Since the off time can usually be varied, the duty cycle can be set, but it must be based on a 32-minute base irrespective of the most efficient period for each compressor. Because a fixed base period is used, it is necesssary to group several loads together in order to achieve significant off times. Since the grouping is at least in part dictated by the power consumed by each load, it is difficult to optimize the off time of a particular load.

Period art management systems are normally unable to sense the needs of each compressor. Rather than turning off an operating compressor to reduce the peak demand, the system instead insures that a load will not come on by removing power to it. Thus, power may be available to a compressor which is not in need, while power is unavailable to one which has been off for some time and is in need of power to restore the temperature to within preset limits, such as in a critical meat case.

Many prior art devices also require timing signals from the utility company's meter in order that both the period and rate of power consumption can be determined. This typically requires special equipment and connections by the power company and thus increases the cost to the consumer. Additionally, many of these systems operate only during peak demand periods to reduce the peak demand, ignoring reductions in consumption which may result from cycling the loads during lower demand times such as at night.

SUMMARY OF THE PRESENT INVENTION

It is therefore an object of the present invention to provide a novel power management system which will cycle off one or more loads chosen on a priority bases whenever a predetermined power demand is exceeded, such off times being preset on an individual basis for each load and followed by an individually set guaranteed power on time.

Another objective is to provide a power management system which cycles the loads during nonpeak hours in order to improve the efficiency of the loads.

A further objective is to provide a system which applies power to unenergized loads sequentially in order to prevent a power surge during startups.

Briefly, the preferred embodiment includes a system controller for monitoring the power consumed by a facility and for developing a control signal whenever power consumption exceeds a preset level or falls below a minimum nighttime level, and a load controller for receiving the control signal and for shutting down the lowest priority load eligible, such shutdown occurring for a first predetermined period of time followed by a second predetermined period of time during which the load is ineligible for shutdown, such first and second times being previously set for each individual load. The load controller also includes a minimum activity driver for generating a consumption control signal whenever a peak control signal has not been received from the system controller within a third preset time, such feature being used to improve the power consumption efficiency of the facility.

An important advantage of the present invention is that loads to be shut down are selected on a preassigned priority and eligibility basis.

Another advantage of the present invention is that loads are shut down for a fixed period followed by a fixed available run time, both times being individually adjustable for each load.

A further advantage is that loads are cycled both in response to the actual power demand exceeding a preset level and periodically whenever the preset level has not been exceeded within a preset period.

These and other objects and advantages of the present invention will no doubt become apparent to those of ordinary skill in the art after having read the following detailed description of the preferred embodiment illustrated in the several figures of the drawing.

DETAILED DESCRIPTION OF THE PREFERRED EMBODIMENT

Figure 1:
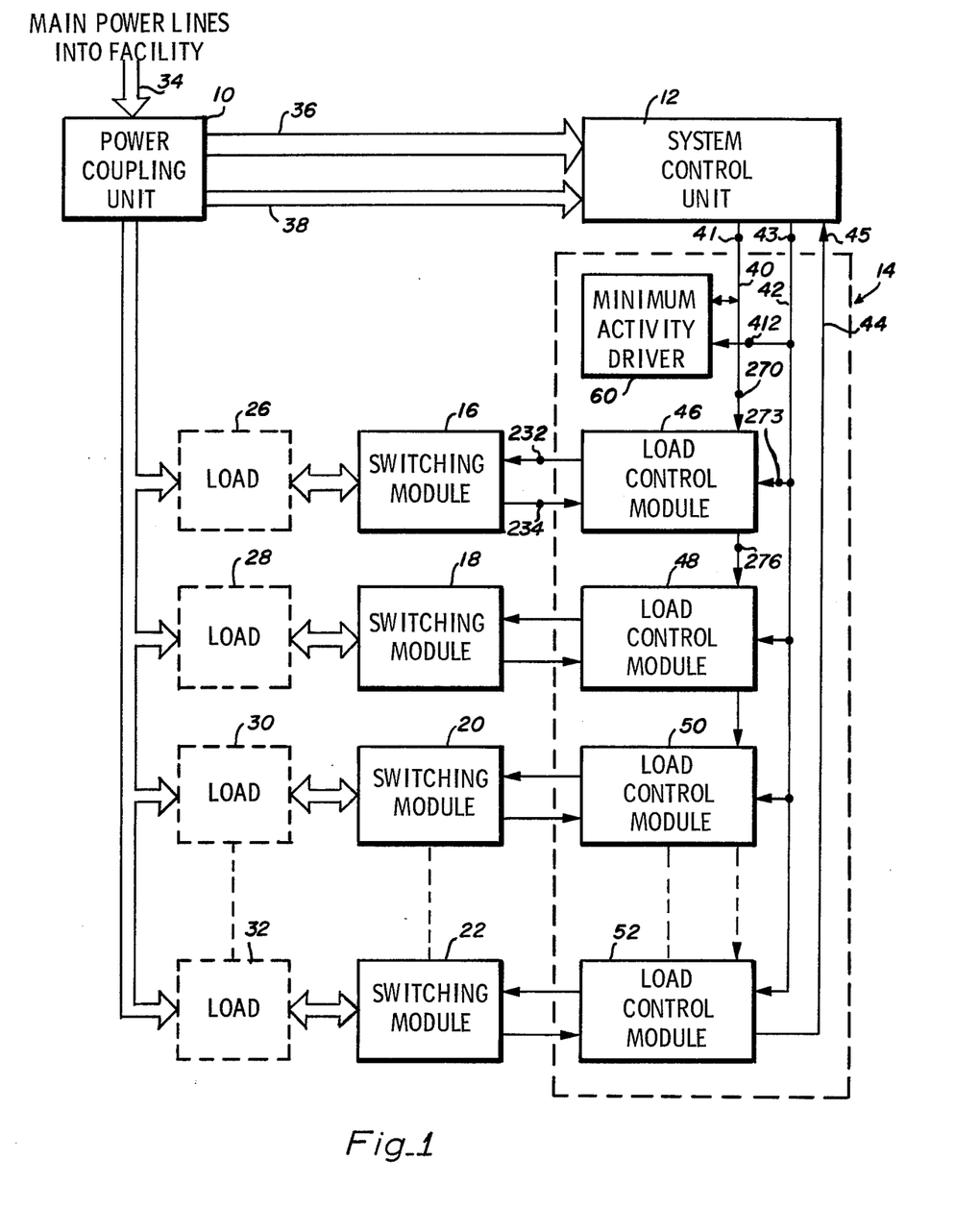
FIG. 1 is a block diagram generally illustrating the principal components of a power management system in accordance with the present invention.

Referring now to the drawing, the principal components of a preferred embodiment of a power management system in accordance with the present invention are shown in block diagram form in FIG. 1 and include a power coupling 10, a system controlling unit 12, a load controlling unit 14 and a plurality of switching modules 16, 18, 20, and 22, each of which operate to enable or disable one of the loads 26, 28, 30, and 32, respectively, which receive power from the main power lines 34. The loads 26-32 might, for example, comprise various lighting circuits, heating circuits, air conditioning circuits, refrigeration circuits, etc. of a supermarket or other commercial establishment or facility using large amounts of electrical power to light, heat and/or cool various compartments thereof.

The power coupling unit 10 includes suitable pickup means for developing electrical signals commensurate with the power input through each of the main power lines 34 and for inputting such signals to the system control unit 12 through the lines 36. Coupling unit 10 also supplies operational potential to control unit 12 via the lines 28. Control unit 12 includes means for monitoring the signals input on lines 36 and means for developing control signals on line 40 for input to load controller 14. Control unit 12 also provides system power on lines 42 for input to load control unit 14 and receives a feedback signal on line 44 which indicates system saturation.

Load control unit 14 is comprised of a plurality of load control modules 46, 48, 50, and 52 which are energized by the potential developed on lines 42 and which are connected is series to receive the control signals developed by control unit 12 on line 40. As illustrated, the module 46 is associated with the load of lowest operational priority, while the module 52 is associated with the load of highest operational priority.

Under control of unit 12 the modules 46-52 respectively interact with the switching modules 16-22 so as to enable or disable various ones of the loads 26-32 on a priority basis and in a manner depending upon the present operational status of a particular load, the operational mode of the system, and the total power being demanded at any point in time by the several loads.

More particularly, the system control unit 12 will continuously monitor the total power level (demand) of the facility and will change its mode of operation and send signals to the load control unit 14 based on various changes which occur in the demand level. Two manually adjustable "set points" are used to cause the system control unit 12 to mantain demand limiting at the higher set point, and switch to a consumption savings mode when the demand level is at or below the lower set point. Thus, during the day when the demand is generally high, demand peaks which exceed the demand limit set point will cause the system control unit 12 to issue a signal to the load control unit 14 so as to shut off a load, and cause a correction in the demand level to a point below the demand limit set point. The system control unit 12 will then remain satisfied until the demand limit is again exceeded. A short time delay of 8 seconds is employed to insure that a motor starting surge or other short duration demand "peak" will needlessly trigger the shutdown of a load. Should the shutdown of one load not be sufficient to correct a demand overlimit condition, delay circuitry within the load control unit 14 will allow the shutdown of additional loads, at 5 second intervals. On the other hand, if the demand limit is not exceeded for long periods of time, the minimum activity driver will send signals to the load controller at regular intervals to maintain minimum cycling activity in the load control unit.

A different mode of operation is achieved when the demand falls to a low value, below the "consumption mode" or low set of control unit 12, such as when the ceiling lights of the facility are turned off at night or on holidays, etc. In this mode, the system control unit 12 will issue a signal to the load control unit 14 on a continuous basis to achieve continuous load cycling and energy consumption savings. By taking advantage of cooler nighttime outside air temperatures, low or non-existent customer activity, and generally less demanding requirements on refrigeration and air conditioning equipment, consumption savings can best be optimized during the nighttime hours.

The load control unit 14 has total responsibility for maintaining proper operation of all loads connected to the system and includes the group of "load control modules" 46-52 which are organized on a prioritized basis such that those loads which can be shut down or "cycled" more often than the others are placed first in the priority chain. Those loads which should not be cycled as often or with more stringent operating requirements are placed as last priority. Each module controls only one load, and the timing scheme necessity for safe cycling of that load is established through the use of 2 timers on the module. A total "shutdown cycle" involves the combined time periods of both of these timers. The first, or "shutdown timer" governs the amount of time that the load will be held in the OFF condition. The second, or "reset timer" governs the amount of time the load must run following a shutdown to insure that the intended duty of the load is adequately performed. When a module is triggered into a shutdown cycle by the system control unit 12 or the minimum activity driver 60, the shutdown cycle begins by first turning the corresponding load OFF for the period of the shutdown timer, and then turning the load back ON for the period of the reset timer. At no time during this cycle is the module "eligible" to be triggered into a new shutdown cycle. A module is also not eligible for shutdown if the load it controls is not running of its own accord. Any signals from the system control unit 12 or the minimum activity driver 60 which are received by a module not eligible for shutdown are simply passed on to the next module in the priority chain and so on, until an eligible module receives the signal.

The load control unit 14 also handles the sequential startup of every load under the control of the system when power returns following a power outage. Each shutdown module in the system creates a short startup delay (up to 30 seconds) whenever its load is turned ON. Because each module in the system is set for a different delay value, sequential starting of all loads in the system occurs when power returns after a power failure or when a branch circuit in the building supplying power to the controlled loads is turned on. This sequential starting of the loads prevents circuit overloads, blown fuses, and tripped circuit breakers.

In summary, the power management system of the present invention addresses three aspects of power control.

(1) Demand limiting;
(2) Consumption limiting; and
(3) Power restart sequencing.

Techniques for the control of every load connected to the system have been developed to provide the utmost flexibility, and to insure that absolute minimum operating requirements for every load are always provided.

Figure 2:
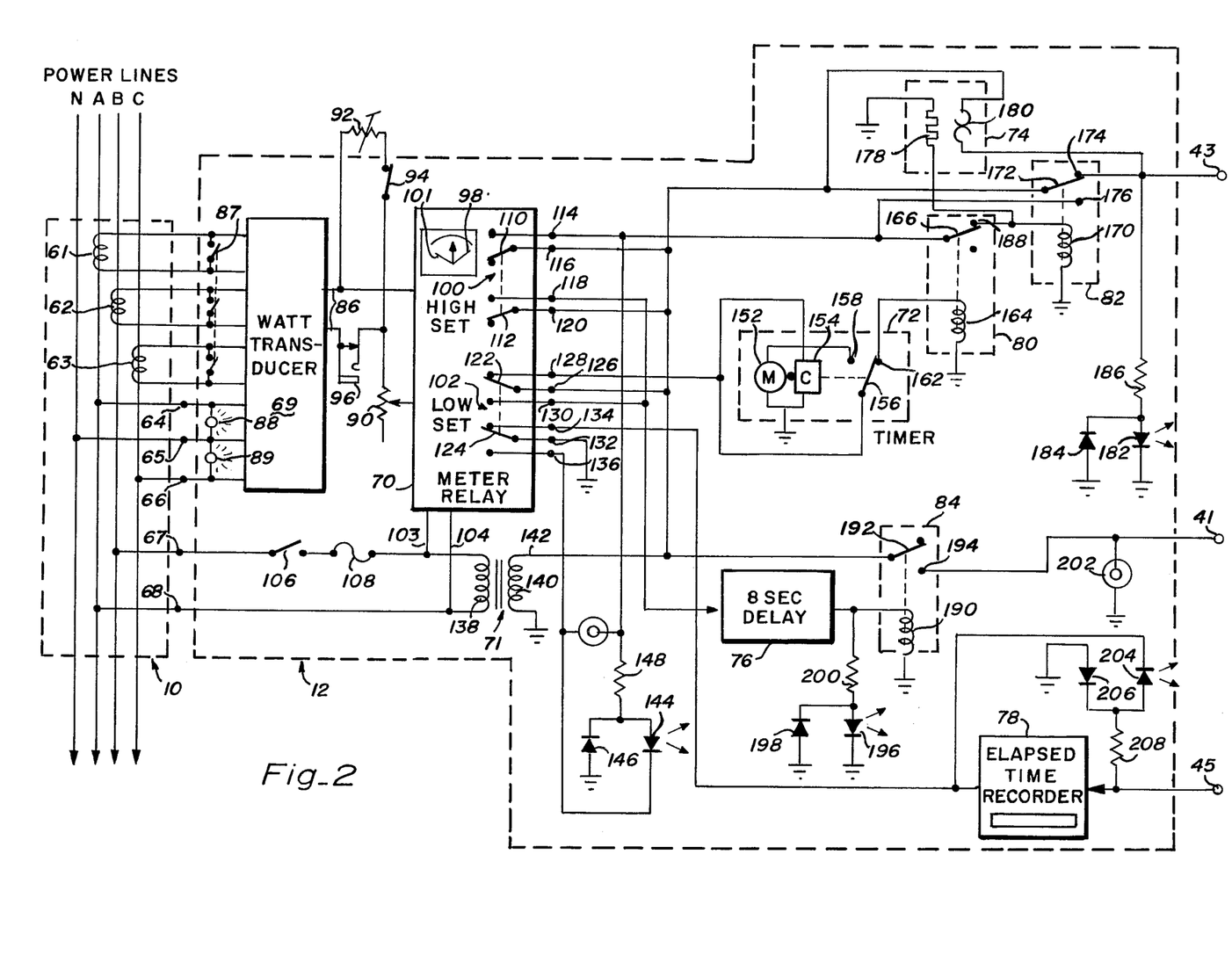
FIG. 2 is a schematic diagram further illustrating the system control unit and power coupling unit shown in FIG. 1.

Referring now to FIG. 2 of the drawing, a more detailed schematic illustration of the power coupling unit 10 and system control unit 12 is depicted. As illustrated, the power coupling unit 10 includes three inductive transducer elements 61, 62 and 63 each of which develop an output voltage that is proportional to the current flowing in one of the conductors of the three phase, four wire power lines being monitored. Unit 10 is also provided with output terminals 64–68 at which the potentials of conductors A, N, C, B and N are respectively made available.

System control unit 12 includes as its principal operative components a watt transducer 69, a meter relay device 70, a power transformer 71, an adjustable timer 72, a 5-second time delay 74, an 8-second delay 76, an elapsed time recorder 78 and three relays 80, 82, and 84. Watt transducer 69 is a device that responds to the signals input from transducers 61–63 and the voltages developed at terminals 64–66 to produce a current output at 86 of a level proportional to the total power passing through the power lines monitored by unit 10. A bank of ganged switches 87 are provided at the input to watt transducer 69 to permit the shorting of transducer elements 61–63 when transducer 69 is to be removed for maintenance. Lamps 88 and 89 are connected across terminals 64–65 and 65–66, respectively, to indicate power main voltages are present.

The output from the watt transducer 69 is input to meter relay 70 through leads 86 and the variable resistor 90. Connected across leads 86 is an additional temperature compensation circuit including an external temperature compensation impedance 92 and a normally closed temperature compensation bypass switch 94. It will be noted that since temperature compensation impedance 92 is in parallel with the meter of relay device 70, it will cause the current input to the meter to be reduced as a function of the temperature of impedance 92. Accordingly, such circuit compensates for changes in ambient temperature occurring both on a diurnal basis and a seasonal basis. The switch 94 is provided to facilitate adjustment of the resistor 90 which is used to select the amount of current diverted by compensating impedance 92. A normally shorted test point 96 is provided to allow for the connection of a recorder to record the power used by the facility during a particular period of time.

Meter relay device 70 includes a needle type indicator 97 which responds to the output of transducer 69 to provide a visual or other indication of the power consumed by the monitored facility. In addition, it includes an adjustable high set point needle 98 and corresponding relay 100, and an adjustable low set point needle 101 and corresponding relay 102. The respective relays are triggered in response to the meter reading. Actuating current for the two relays is provided through lines 103 and 104 which are connected to the terminals 67 and 68 through a power on/off switch 106 and a fuse 108.

High set relay 100 includes a pair of ganged together armatures 110 and 112 which open and close circuits coupling relay output terminals 114 and 116, and 118 and 120, respectively. Low set relay likewise includes a pair of ganged together armatures 122 and 124 which respectively couple output terminal 126 to either output terminal 128 or output terminal 130, and output terminal 132 to either output terminal 134 or output terminal 136. Note that terminals 116, 120 and 126 are connected in common, 118 and 130 are connected in common, and 132 is connected to circuit ground. The armatures of relays 100 and 102 are shown in the positions assumed when the monitored power level lies between the low set point and the high set point. An increase in power consumption beyond the high set point will cause the armatures 110 and 112 to switch to their upper position while a reduction in power below the low set point level will cause the armatures 122 and 124 to switch to their lower positions.

Power transformer 71 has its primary 138 connected across terminals 67 and 68 through switch 106 and fuse 108, and its secondary 140 grounded on one side with the other side 142 connected to the output terminals 116, 120 and 126 of relay device 70. Transformer 71 is a step-down transformer which transforms the line potential to 24 volts AC to provide operational power for the power management system. A system fault indicator circuit, including an LED 144, a diode 146 and resistor 148, is connected across terminals 114 and 136. A test point 150 is also provided for enabling operation of the fault circuit to be checked. Meter relay 70 is shown with its relay armatures in the operative positions assumed when power applied and the power consumption of the loads is between the low set point and the high set point. It will be appreciated that if the high and low set points are accidentally reversed so that the high reading is selected below the low reading and the measured power lies between the two readings the armatures 110 and 124 will change positions from that shown, connect transformer secondary 140 across the fault indicating circuit and thereby indicate the fault.

Timer 42 is an adjustable period device having a timer motor 152, an electrically actuated clutch 154, and a clutch actuated switch 156. Meter relay terminal 128 is connected to clutch 154 and to the armature 160 of switch 156 so that clutch 154 will be energized when switch 122 is in the position indicated and will cause switch 156 to engage contact 158. Since timer motor 152 is connected between circuit ground and contact 158 it will begin timing for its preset period. Switch contact 162 is connected to the top side of the actuating solenoid 164 of the relay 80 which includes an armature 166 that in its normally closed position engages contact 168 to connect the top of the solenoid 170 of relay 82 to meter relay terminal 114. Relay 82 includes an armature 172 which normally engages its contact 174 to couple the top side 142 of transformer secondary 140 to system power terminal 41, but when actuated by solenoid 170 engages its contact 176 which couples the 24 volt supply to the armature 166 of relay 80. The normally open two-second thermal delay device 74 has its heating element 178 coupled between contact 188 of relay 80 and circuit ground and its normally open contacts 180 connected across the armature 172 and contact 174 of relay 80. In order to indicate that system power is being developed at terminal 43, an indicator circuit including an LED 182, a diode 184 and a resistor 186 is coupled between terminal 43 and circuit ground.

The function of timer 72, delay device 74 and relays 80 and 82 is to momentarily interrupt the system power available at terminal 43 in the event that the peak demand limit established by the high set point is exceeded during some predetermined time (set in timer 72) after the consumption level has moved from a low level (below the low set point) to a level above the low set point. This will be detected by movement of armature 122 into the upper contact position indicated and will cause timer clutch 154 to be energized by the output of transformer 71. This will in turn cause armature 156 to engage contact 158 and power timer motor 152.

If prior to the expiration of the period (normally 20 to 30 minutes) the power demand should exceed the high set point, the movement of armature 110 into its upper position will actuate relay 82 and break the system power path through armature 172 and contact 174. However, an armature 172 engages contact 176 it will energize the heating element 178 of delay 74 and two seconds thereafter system power will be re-established at terminal 43 through contacts 180.

As will be apparent as the description proceeds this momentary interruption of system power will reset each of the load control modules 46–52 and thus make all loads immediately available for shutdown. In the event the high set point is not exceeded before timer 72 times out, the termination of its period will have no effect other than to actuate relay 80.

The top side of solenoid 190 of relay 84 is coupled through the eight-second delay 76 to meter relay terminals 118 and 130 while the armature 192 thereof is connected to the top side 142 of secondary 140 of transformer 171. The normally open contact 194 of relay 84 is connected to output terminal 41. In order to indicate actuation of relay 84 on the resultant presence of a control signal at terminal 41 an indicator circuit including the LED 196, diode 198 and resistor 200 is coupled between the top side of solenoid 190 and circuit ground. A test point 202 is also provided for monitoring the output at terminal 41.

The function of delay 76 is to insure that transient demand excursions above the high set point do not cause a shutdown signal to be developed at terminal 41 (by actuation of relay 84) unless the movement of armature 112 of relay 102 into its upper position exceeds 8 seconds in duration.

The elapsed time meter 78 is connected between terminal 45 and meter relay terminal 134 and as will be further discussed below serves to record the total time that the system is in saturation. The saturation condition is also visually indicated by the indicator circuit including LED 204, diode 206 and resistor 208.

Figure 3:
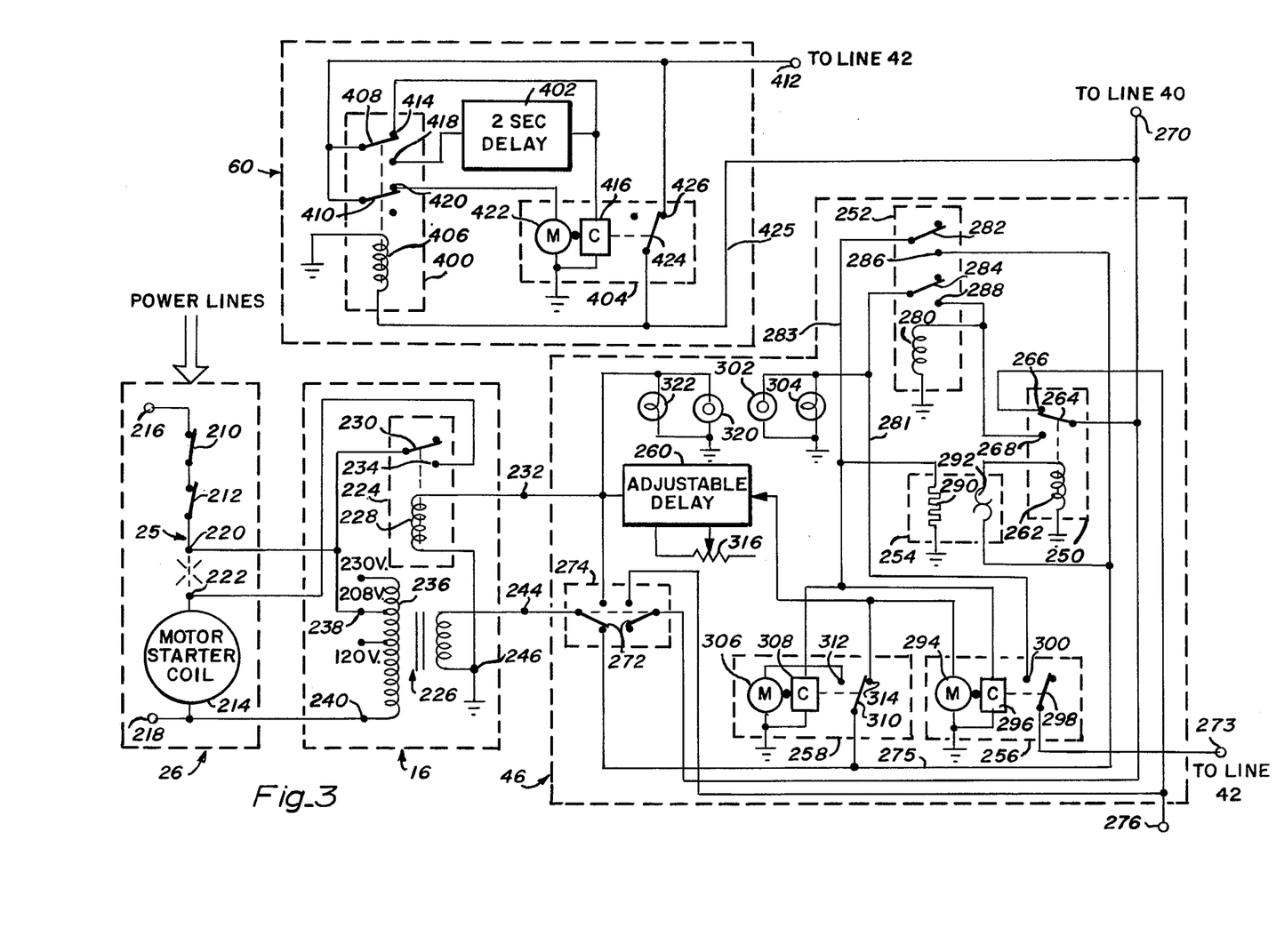
FIG. 3 is a schematic diagram further illustrating one of the load control modules, one of the switching modules and the minimum activity driver shown in FIG. 1.

In FIG. 3 of the drawing, the switching module 16, load control module 46, load actuating circuit 25 of load 26 and minimum activity driver 60 are shown to illustrate the principal components thereof. It will of course be appreciated that the other corresponding modules and loads illustrated in FIG. 1 are similar. For purposes of illustration, the load actuating circuit 25 is shown to include a motor starting switch 210, an overload, overspeed or other limit switch 212, and a motor starter coil 214 all connected in series between the motor connection terminals 216 and 218. In adapting the load actuating circuit for control by the present invention, the circuit is broken as indicated and a pair of terminals 220 and 222 are provided as indicaed.

The switching module 16 is essentially comprised of a relay 224 and a step down transformer 226. Relay 224 includes a solenoid 228 and a solenoid actuated armature 230. One side of solenoid 228 is grounded and the other side is connected to the terminal 232. Armature 230 is connected to motor actuating circuit terminal 220 and the contact 234 is connected to motor actuating circuit terminal 222.

In the preferred embodiment, transformer 226 has a plural tapped primary winding 236 with the several taps being adapted for connection to 230, 208 and 120 volts AC, respectively. As illustrated, the 208-voltage tap 238 is connected to actuating circuit terminal 220, and the common winding terminal 240 is connected to actuating circuit terminal 218. Secondary winding 242 is adapted to develop 24 volts AC across its two terminals 244 and 246. Terminal 246 is connected to circuit ground.

The principal operative components of module 46 are a pair of relays 250 and 252, a thermal delay unit 254, a reset timer 256, a shut down timer 258 and an adjustable delay unit 260. Relay 250 includes a solenoid winding 262 and a solenoid actuated armature 264 which normally engages a contact 266 and when actuated engages a contact 268. Armature 264 is connected to line 40 at terminal 270 and is also connected to the armature 272 of a bypass switch 274. Contact 266 of relay 250 is connected to an output terminal 276 which, as illustrated in FIG. 1, is coupled to the input of load control module 48.

Relay 252 includes a solenoid winding 280 and a pair of solenoid actuated armatures 282 and 284. When actuated, armature 282 engages a contact 286 that is connected through switch 274 to terminal 244 as will be described in more detail below. When actuated armature 284 engages a contact 288 that is connected to the high side of winding 280 and to the contact 268 of relay 250. Thermal delay 254 has a heating element 290 which is connected to armature 282 of relay 252 and a normally closed bimetallic switching mechanism 292 which is connected between contact 286 of relay 252 and the top side of solenoid 262 of relay 250.

Reset timer 256 includes a motor 294 and electrically actuated clutching mechanism 296 and a clutch actuated switching armature 298. Clutch 296 is connected between armature 282 of relay 252 and circuit ground, and when energized, causes the armature 298 to engage a contact 260 which is connected to the armature 284 of relay 252. A test point 302 and indicator light 304 are also connected to armature 244 to provide an indication that the control module is in a reset cycle.

Shut down timer 158 similarly includes a motor 306, a clutching mechanism 308 and a clutch actuated switching mechanism including an armature 310. Motor 306 is connected betweeen the normally open contact 312 and circuit ground. Clutching mechanism 308 is connected between the armature 282 of relay 252 and circuit ground, and the armature 310 is connected to contact 286 of relay 252 and the bimetallic switching elements 292. Armature 310 normaly engages contact 314 which is connected to the energizing circuit of motor 294 of timer 256.

The adjustable delay 260 includes an adjustment potentiometer 316 and is connected between the terminal 318 and the commonly connected contact 314 of timer 258 and motor 294 of timer 256. A test point 320 and indicator lamp 322 are also connected to the terminal 232. Lamp 322 indicates when the control module is in a shutdown cycle.

Minimum activity driver 60 includes a relay 400, a two-second delay unit 402 and an adjustable timer 404. Relay 400 includes a solenoid winding 406 and a pair of solenoid actuated armatures 408 and 410 that are commonly connected to the terminal 412 which is in turn connected to system control unit 12 via line 42. Armature 408 normally engages a contact 414 which is connected to the clutching mechanism 416 and the output side of delay 402 and when actuated engages a second contact 418 connected to the input side of delay 402. Armature 410 normally engages a contact 420 that is connected to the motor 422 of timer 404. In addition to the motor 422 and clutching mechanism 416 timer 404 includes a switching device, the armature 424 of which normally engages a contact 426 that is connected to terminal 412.

Figure 4:
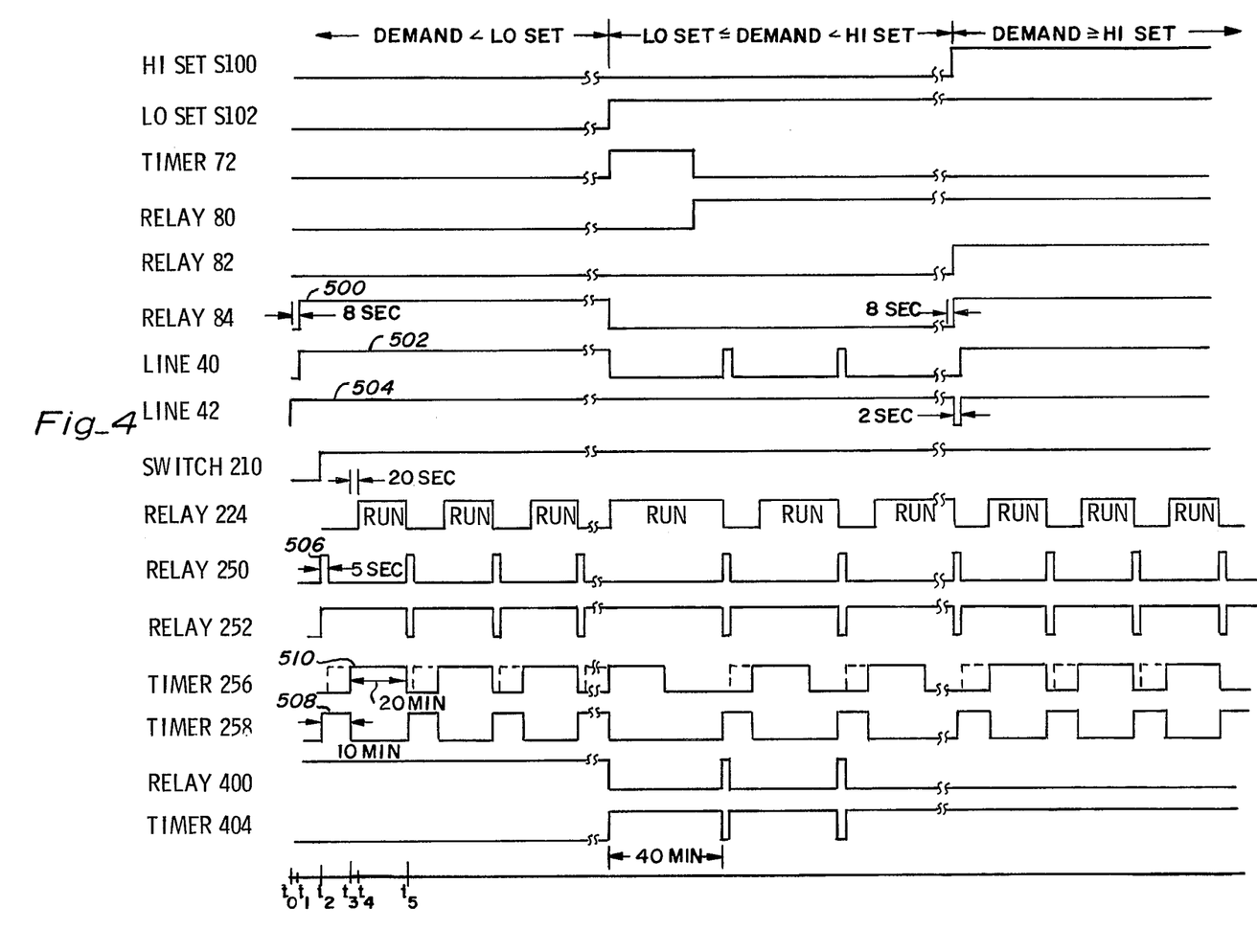
FIG. 4 is a timing diagram illustrating the operative states of the various components of the power management system shown in FIG. 1.

In order to explain the operation of the present invention, additional reference is made to FIG. 4 of the drawing which is a timing diagram illustrating the operative states of the various components during a condition where the load 26 is for convenience assumed to be continuously energized. This is of course not the case in a real situation but will allow a more meaningful operational explanation to be given. For the purpose of this example timer 72 is set to time out in 30 minutes, thermal delay switch 74 is a 2 second delay device, delay means 76 is an 8 second delay device, thermal delay 254 is a five second delay device, timer 256 is set to have a reset period of twenty minutes, timer 258 is set to have a shutdown period of 10 minutes, adjustable delay 260 is set to have a 20 second delay period, delay device 402 is a 2 second delay and timer 404 is set to time out in 40 minutes.

Assuming that at the time switch 106 is flipped to the ON position, the power consumption level is less than the low set point, armature 122 of the low set relay 102 will be in position to engage its lower contact and cause a 24 volt signal to pass from transformer 71 through delay unit 76 to energize relay 84 after an 8 second delay as indicated in FIG. 4 at 500 and raise terminal 41 (line 40) to a 24 volt potential level as illustrated at 502. Since the armature 172 of relay 82 normally engages contact 174, terminal 43 (line 42) will also be raised to the 24 volt potential as indicated at 504. If now at time $t_2$, switch 210 (FIG. 3) is closed in an attempt to energize load 26, power will be applied to the primary winding 236 of transformer 226 causing a 24 volt output at terminal 244. This voltage will be applied through armature 272 of switch 274 and armature 310 of timer 258 to delay unit 260 and unless contact is broken between armature 310 and contact 314 before the 20 second delay period has elapsed, relay 224 will be actuated and the load will be energized.

However, note that the output of transformer 226 is also coupled via line 275 through thermal delay unit 254 to the solenoid winding 262 of relay 250. Accordingly, relay 250 will be energized, immediately causing its armature 264 to engage contact 268. And since line 40 is raised to 24 volts, solenoid 280 of relay 252 will be energized causing its armature 284 to engage contact 288 and complete a circuit through line 281 to terminal 300 of timer 256. Simultaneously, armature 282 will be caused to engage contact 286 which is also raised to the 24 volt potential supplied by transformer 226 and this voltage will be applied through line 283 to actuate clutch 308 of timer 258 and clutch 296 of timer 256 thereby causing armatures 310 and 298 to engage contacts 312 and 300, respectively. Actuation of the armature 310 disconnects the circuit leading to delay means 260 and energizes its motor 306 thereby starting the shutdown sequence.

The power applied to clutches 308 and 296 is also supplied to the heater 290 of thermal delay unit 254 and, as indicated at 504 in FIG. 4, will cause the contacts 292 to break after five seconds have elapsed and thereby deenergize relay 254. However, since line 42 is raised to 24 volts, power will be supplied to relay coil 280 through armature 298 of timer 256 and consequently the opening of thermal contacts 292 will have no effect on the operation other than to deenergize relay 250. After shutdown timer 258 has timed out, i.e., ten minutes have elapsed as indicated at 508, armature 310 will return to engagement with contacts 314 to again supply power to delay unit 260 and will energize timer motor 294 to start the reset sequence. Following a twenty second delay in unit 260 solenoid 228 of relay 224 will be energized causing armature 230 to engage contact 234 and complete a circuit between the terminals 220 and 222 thereby causing load 26 to be energized. Timer 256 will then continue to time out (as indicated at 510) for the next twenty minutes during which time the load will be allowed to run without interruption. Following the twenty minute reset period armature 298 will be disengaged from contact 300 thereby breaking the energizing circuit from line 42 to solenoid 280 and deenergizing relay 252. This of course clutches 308 and 296 to likewise be deenergized.

As relay 252 is deenergized, the power supplied to heater 290 of thermal delay unit 254 is also removed, allowing the contacts 292 to reengage and again actuate relay 250 and cause the just described cycle to repeat itself. This cycling will repeat itself so long as the long 26 is eligible, i.e., so long as switches 210 and 212 are closed. If either of these switches were to be opened, no power would be applied to transformer 226 and thus relay 250 would not be energized and the potential on line 40 would flow through armature 264 and contact 266 to the output terminal 276 where it would be applied to the next control module 48. If module 48 were to be eligible, it would be caused to cycle as described above. If it were ineligible, the potential would be supplied to the next eligible load in the series, etc. If no load is eligible the last module 52 will pass the control voltage on to line 44 (FIG. 1) and the duration of its presence on line 44 will be recorded by recorder 78 (FIG. 2).

If it is now assumed that the demand level exceeds the low set point but is less than the high set point, it will be appreciated that the low set relay 102 (FIG. 2) will switch to its upper position causing terminal 134 to be grounded and terminal 128 to be coupled to the 24 volt control supply provided by transformer 71. When terminal 128 is raised to 24 volts, it will cause clutch 154 of timer 72 to move armature 156 into engagement with contact 158 thereby energizing motor 152 and causing timer 72 to begin its thirty minute timing sequence, following which armature 156 will be returned to engage contact 162 and energize relay 80. Note, however, that so long as the high set point is not exceeded, actuation of relay 80 will have no operative effect on the circuit since no power is coupled through the relay armature 166. However, should the high set point be exceeded before the expiration of the thirty minute period, armature 110 will cause the 24 volt signal to be coupled through armature 166 to energize relay 82 and break the power path to terminal 43, thereby removing system power from load control unit 14.

It should be noted however, that when relay 82 is energized, armature 172 engages contact 176 and couples the power supply through armature 166 to the heating element 178 of the thermal delay unit 74. Accordingly, following a two second time interval, power will again be supplied to terminal 43 through the contacts 180. The effect of momentarily removing the power from system power terminal 43 (line 42) is to cause each of the load control modules to be reset so that any control signal raised on line 40 as a result of the high set point being exceeded can be used to shutdown any eligible loads.

Since no control signal is raised on line 40 unless the high set point is exceeded, or the demand falls below the low set point, the minimum activity driver will now come into play. As shown in FIG. 3, power supplied along the line 42 will be input to driver 60 through terminal 412 and will be coupled through armature 408 of relay 400 to actuate clutch 416 and cause armature 424 to break from its contact 426. At the same time, power is supplied through armature 410 and its contact 420 to motor 422 causing timer 404 to begin its 40 minute timing sequence. At the end of the stated period, armature 424 will again engage contact 426 and cause the system power to be supplied therethrough to energize coil 406 and pull the armatures 408 and 410 into their lower position coupling the system power (line 42) to the input of delay unit 402. Following a two second delay, clutch 416 will again be energized and interrupt the power supplied to solenoid 406 and line 40 via line 425. The resulting two second pulse developed on line 40 will cause the eligible control unit 46 to begin its shutdown cycle as previously described. At the same time timer 404 will begin its next 40 minute countdown sequence so that if during the next 40 minutes it is not reset by the occurrence of a demand level which exceeds the high set point, it will again trigger a shutdown cycle at the end of its period. This procedure will continue to be followed so long as the facility demand stays between the high set point and low set point. This is called the consumption savings mode.

Now to continue the example, assume that the demand equals or exceeds the high set point. In such case armature 112 will cause the output of transformer 71 to be connected to delay unit 76 which will, after 8 seconds, energize relay 84 and couple the 24 volt transformer output to terminal 41 (line 40). Armature 110 will also couple the power supply potential through armature 166 of relay 80 to energize relay 82 and cause a two second interruption of ower to terminal 43 as previously described. This will have the effect of resetting each of the load control modules so that the control signal developed on line 40 can shutdown the first available load in the priority chain without waiting for any existing reset period to elapse.

It will thus be appreciated that the above-described system provides continuous power management so as to both effect consumption savings by eliminating unnecessary compressor idling and by maintaining the demand level below a selected level. It will, of course, be understood that many alterations and modifications of the above-described circuit could be made to adapt the system to a large variety of types of facilities having various types of power consumption devices to be managed. It is therefore intended that the following claims be interpreted as covering all such alterations and modifications as fall within the true spirit and scope of the invention.

What is claimed is:

1. A power management system for improving the power utilization of a facility having a plurality of electric power consuming loads, comprising:
    system control means for monitoring the power input to the facility and for developing a first control signal when the input power exceeds a predetermined peak level; and
    load control means for monitoring each load of the facility to determine which loads are running and therefore are eligible for shutdown on a prioritized basis, said load control means being responsive to said first control signal and operative to shutdown for predetermined periods of time one or more of the lowest priority eligible loads in the facility as required to prevent the peak power consumption of the facility from exceeding said predetermined peak level.

2. A power management system as recited in claim 1 wherein said load control means includes a plurality of individual control modules each corresponding to one of the loads to be controlled and each including a first timing means for determining the duration of a shutdown period for its controlled load.

3. A power management system as recited in claim 2 wherein said control modules are connected in series such that if the shutdown of the lowest priority module that is eligible does not reduce the facility power consumption below said predetermined peak level, the next control module in the series will be caused by said first control signal to shutdown its corresponding load and so forth until said predetermined peak level is reached.

4. A power management system as recited in claim 2 wherein each said control module further includes a second timing means for determining the duration of a reset period following expiration of said shutdown period, such second timing means being operative to prevent shutdown of the controlled load during the reset period.

5. A power management system as recited in claim 4 wherein said load control means further includes a minimum activity drive means for monitoring said first control signal and for developing a second control signal for application to said control modules in the event that said first control signal does not occur within a predetermined interval of time.

6. A power management system as recited in claim 4 wherein each said control module further includes delay means for delaying the shutdown of its controlled load for a predetermined period of time.

7. A power management system as recited in claim 4 and further comprising a plurality of switching modules for connecting each of said control module to a corresponding controlled load to provide a control interface therebetween.

8. A power management system as recited in claim 7 wherein a portion of the operative power required by said load control means is supplied by said system control means and another portion of the power required by said load control means is supplied by the loads through said switching modules.

9. A power management system as recited in claim 4 wherein said system control means includes a first adjustable power level detector for detecting when said input power reaches said predetermind peak level and a second adjustable power level detector for detecting when said input power reaches a selected lower power level and means responsive to outputs developed by said first and second detectors for developing said first control signal when the detected power level is less than said lower limit and greater than said upper limit.

10. A power management system as recited in claim 9 wherein said system control means includes a timing mechanism for generating a signal causing each of said load control modules to be reset and made ready to shutdown its load if the power consumed by said facility exceeds said predetermined peak level prior to the passage of a selected period of time following a detected change of input power from a level below said lower power level to a level at or above said lower power level.

11. A power management system as recited in claim 1 wherein said system control means includes a first adjustable power level detector for detecting when said input reaches said predetermined peak level and a second adjustable power level detector for detecting when said input power reaches a selected lower power level and means responsive to outputs developed by said first and second detectors for developing said first control signal when the detected power level is less than said lower limit and greater than said upper limit.

12. A power management system as recited in claim 11 wherein said system control means includes a timing mechanism for generating a signal causing each of said load control modules to be reset and made ready to shutdown its load if the power consumed by said facility exceeds said predetermined peak level prior to the passage of a selected period of time following a detected change of input power from a level below said lower power level to a level at or above said lower power level.

13. A power management system as recited in claim 11 wherein said load control means includes a plurality of individual control modules each corresponding to one of the loads to be controlled and each including,
   a first timing means for determining the shutdown time of its controlled load, and
   a second timing means for determining the duration of a reset period following expiration of said shutdown period, such second timing means being operative to prevent shutdown of the controlled load during the reset period.

14. A power management system as recited in claim 13 and further comprising a plurality of switching modules for connecting each of said control module to a corresponding controlled load to provide a control interface therebetween.

15. A power management system as recited in claim 13 wherein said load control means further includes a minimum activity drive means for monitoring said first control signal and for developing a second control signal for applicaton to said control modules in the event that said first control signal does not occur within a predetermined interval of time.

16. A power management system as recited in claim 13 wherein said control modules are connected in series such that if the shutdown of the lowest priority module that is eligible does not reduce the facility power consumption below said predetermined peak level, the next control module in the series will be caused by said first control signal to shutdown its corresponding load and so forth until said predetermined peak level is reached.

17. A power management system as recited in claim 16 wherein said system control means includes an elapsed time recorder and the highest priority control module in said series includes means for coupling said control signal to said recorder if its corresponding load is either ineligible for shutdown or its shutdown fails to reduce said input power to less than said predetermined peak level, said recorder thereby providing an accumulative read out of the time that the system is incapable of reducing the input power level below the said predetermined peak level.

18. A power management system as recited in claim 13 wherein said system control means includes a timing mechanism for generating a signal causing each of said load control modules to be reset and made ready to shutdown its load if the power consumed by said faclity exceeds said predetermined peak level prior to the passage of a selected period of time following a detected change of input power from a level below said lower power level to a level at or above said lower power level.

19. A power management system as recited in claim 1 and further comprising a power coupling unit for coupling power from the monitored facility input power transmission lines into said system control means.

20. A power management system as recited in claim 19 wherein a portion of the operative power required by said load control means is supplied by said system control means and another portion of the power required by said load control means is supplied by the loads.

* * * * *